(12) United States Patent
Kelly (10) Patent No.: US 10,246,812 B2
(45) Date of Patent: Apr. 2, 2019

(54) PORTABLE AND VERSATILE DRYING RACK

(71) Applicant: Phillip Earl Kelly, Rancho Santa Fe, CA (US)

(72) Inventor: Phillip Earl Kelly, Rancho Santa Fe, CA (US)

( * ) Notice: Subject to any disclaimer, the term of this patent is extended or adjusted under 35 U.S.C. 154(b) by 0 days.

(21) Appl. No.: 15/710,582

(22) Filed: Sep. 20, 2017

(65) Prior Publication Data

US 2018/0080168 A1  Mar. 22, 2018

Related U.S. Application Data

(60) Provisional application No. 62/397,795, filed on Sep. 21, 2016.

(51) Int. Cl.

| | |
|---|---|
| *D06F 57/00* | (2006.01) |
| *D06F 57/12* | (2006.01) |
| *B60R 9/045* | (2006.01) |
| *B60R 9/02* | (2006.01) |
| *B60R 9/058* | (2006.01) |
| *B60R 9/06* | (2006.01) |
| *B60P 3/36* | (2006.01) |
| *B60R 11/00* | (2006.01) |

(52) U.S. Cl.
CPC ............ *D06F 57/12* (2013.01); *B60P 3/36* (2013.01); *B60R 9/02* (2013.01); *B60R 9/045* (2013.01); *B60R 9/058* (2013.01); *B60R 9/06* (2013.01); *B60R 11/00* (2013.01); *B60R 2011/004* (2013.01)

(58) Field of Classification Search
CPC .. D06F 57/12; B60R 3/36; B60R 9/02; B60R 9/045; B60R 9/058; B60R 9/06; B60R 11/00; B60R 2011/004
USPC .................................................. 224/282, 502
See application file for complete search history.

(56) References Cited

U.S. PATENT DOCUMENTS

| | | | | |
|---|---|---|---|---|
| 4,428,516 | A | * | 1/1984 | Allen ........................ B60R 9/06 224/309 |
| 4,518,108 | A | * | 5/1985 | Allen ........................ B60R 9/06 224/314 |
| 5,611,119 | A | * | 3/1997 | Allen ........................ B60R 9/06 24/265 H |
| 5,645,202 | A | * | 7/1997 | Kaloustian ................ B60R 9/06 224/314 |
| 5,971,241 | A | * | 10/1999 | Allen ........................ B60R 9/06 224/314 |

(Continued)

*Primary Examiner* — Peter N Helvey (57) ABSTRACT

A drying rack designed to easily mount to a vehicle or other similar structure that is portable and collapsible. The drying rack includes a U-shaped bracket, a first support arm, a second support arm, a drying rod, a first locking hinge, and a second locking hinge. The first support arm and the second support make up the frame and are positioned parallel and offset to each other. The first support arm is terminally mounted to a first leg of the U-shaped bracket through the first locking hinge. Similarly, the second support arm is terminally mounted to a second leg of the U-shaped bracket through the second locking hinge. The drying rod is perpendicularly connected in between the first support arm and the second support arm. Additionally, the drying rod and the U-shaped bracket are positioned opposite to each other, across the first support arm and the second support arm.

13 Claims, 6 Drawing Sheets

(56) References Cited

U.S. PATENT DOCUMENTS

| | | | | |
|---|---|---|---|---|
| 7,118,016 B1* | 10/2006 | Kolda | ............... | B60R 9/06 224/500 |
| 7,857,179 B1* | 12/2010 | Allen | ............... | B60R 9/10 224/329 |
| 8,636,184 B2* | 1/2014 | Allen | ............... | B60R 9/10 224/314 |
| 9,815,415 B2* | 11/2017 | Condon | ............... | B60R 9/06 |
| 2002/0038810 A1* | 4/2002 | Robins | ............... | B60R 9/06 224/532 |
| 2002/0117524 A1* | 8/2002 | Jeong | ............... | B60R 9/06 224/314 |
| 2006/0186161 A1* | 8/2006 | Huang | ............... | B60R 9/06 224/497 |

\* cited by examiner

PORTABLE AND VERSATILE DRYING RACK

The current application claims a priority to the U.S. Provisional Patent application Ser. No. 62/397,795 filed on Sep. 21, 2016.

FIELD OF THE INVENTION

The present invention relates generally to a means of facilitating the drying process for wet or damp clothing, towels, and other absorbent items. More specifically, the present invention relates to a drying rack optimized for removable addition to a vehicle that will allow a user to hang dry items. The rack of the present invention folds into the mount for space-efficient storage.

BACKGROUND OF THE INVENTION

Aquatic sports are among the most popular of athletic endeavors enjoyed by people around the world. Every year, particularly in the warmer months, the coast floods with surfers and general beachgoers who are interested in enjoying the ocean spray. Pools and lakes provide more enjoyable outlets for people who want to cool off from the summer heat. Towels, swimsuits, wetsuits, gloves, caps, and more equipment are critical items for water sports enthusiasts to ensure proper protection and recovery.

However, even after a long day in the water, the day is not always over for many social sports groups, who may decide to move from the beach or poolside to a new outdoor location to socialize. The day's accumulated wet gear is often flung across car hoods, side mirrors, truck beds, doors, roof racks, and more to allow for drying. This can cause damage to the vehicle, as the particulate-filled water can corrode or chip away at metals and paint. Such drying is also ineffective, as the wet or damp articles cannot spread out to allow for optimal water evacuation, and instead tend to retain water, resulting in the potential accumulation of mold and mildew. What is needed is a device that can attach to the outside of a vehicle to allow for optimal drying and holding of clothing, towels, or other wet items. Further, such a device that can also fold flat for convenient storage is also desirable.

The present invention addresses these issues. The present invention has a series of rungs that allow for items to dry separately and effectively, away from the vehicle to which the present invention is attached. The present invention can be mounted upon a side mirror of a vehicle for securely hanging lighter wet items, or can be mounted with straps to a vehicle door for heavier items. The present invention folds flat for convenient storage within a vehicle. A set of rubber stoppers positioned in strategic locations around the present invention protects the vehicle from receiving damage due to the weight or pressure resulting from the addition of heavy wetsuits, which can weigh upwards of 25 pounds each. The present invention can be mounted to cars, truck beds, RVs, roof racks, vehicle doors, and a variety of other locations on a variety of vehicles. In addition, a strap can be added to secure the present invention in a variety of ways to alternative support structures.

DETAIL DESCRIPTIONS OF THE INVENTION

All illustrations of the drawings are for the purpose of describing selected versions of the present invention and are not intended to limit the scope of the present invention.

The present invention generally related to vehicle accessories and drying racks. More specific, the present invention is a portable and a collapsible drying rack that is designed to be mounted externally to a vehicle for optimal drying of clothes and other similar items. Additionally, the present invention provides a variety of mounting methods onto a vehicle or other similar structures.

Figure 1:
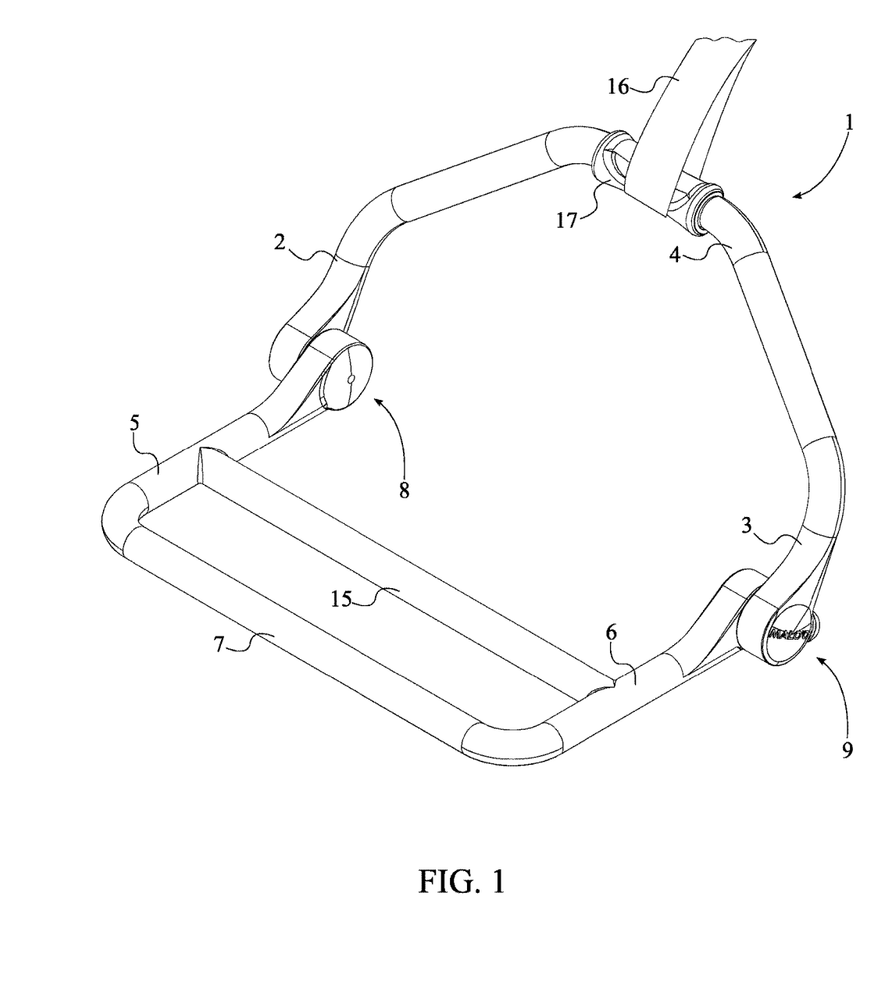
FIG. 1 is a perspective view of the present invention.

Referring to FIG. 1, the present invention comprises a U-shaped bracket 1, a first support arm 5, a second support arm 6, a drying rod 7, a first locking hinge 8, and a second locking hinge 9. The U-shaped bracket 1 mounts the present invention to an external structure, such as a side mirror of a vehicle. The U-shaped bracket 1 comprises a first leg 2, a second leg 3, and an interconnecting rod 4. The first leg 2 and the second leg 3 are each an elongated rod that are positioned parallel and offset to each other, across the interconnecting rod 4. Additionally, the first leg 2 and the second leg 3 are each adjacently connected to the interconnecting rod 4 to yield the aforementioned U-shape. The interconnecting rod 4 is an elongated structure which hooks onto an external structure. As such, it is preferred that the interconnecting rod 4 is symmetrically curved as seen in FIG. 1. This ensures that weight is evenly distributed about the U-shaped bracket 1, thus ensuring the present invention maintains a vertical orientation. The first support arm 5, the second support arm 6, and the drying rod 7 make up a drying rack, similar to traditional designs. More specifically, the first support arm 5 and the second support arm 6 are each an elongated rod which together make up the frame of the drying rack. The first support arm 5 and the second support arm 6 are position parallel and offset to each other, mirroring the first leg 2 and the second leg 3. The drying rod 7 is preferably an elongated structure with a circular cross-section which receives clothes and items in need of drying. The drying rod 7 is positioned in perpendicularly connected in between the first support arm 5 and the second support arm 6.

Figure 4:
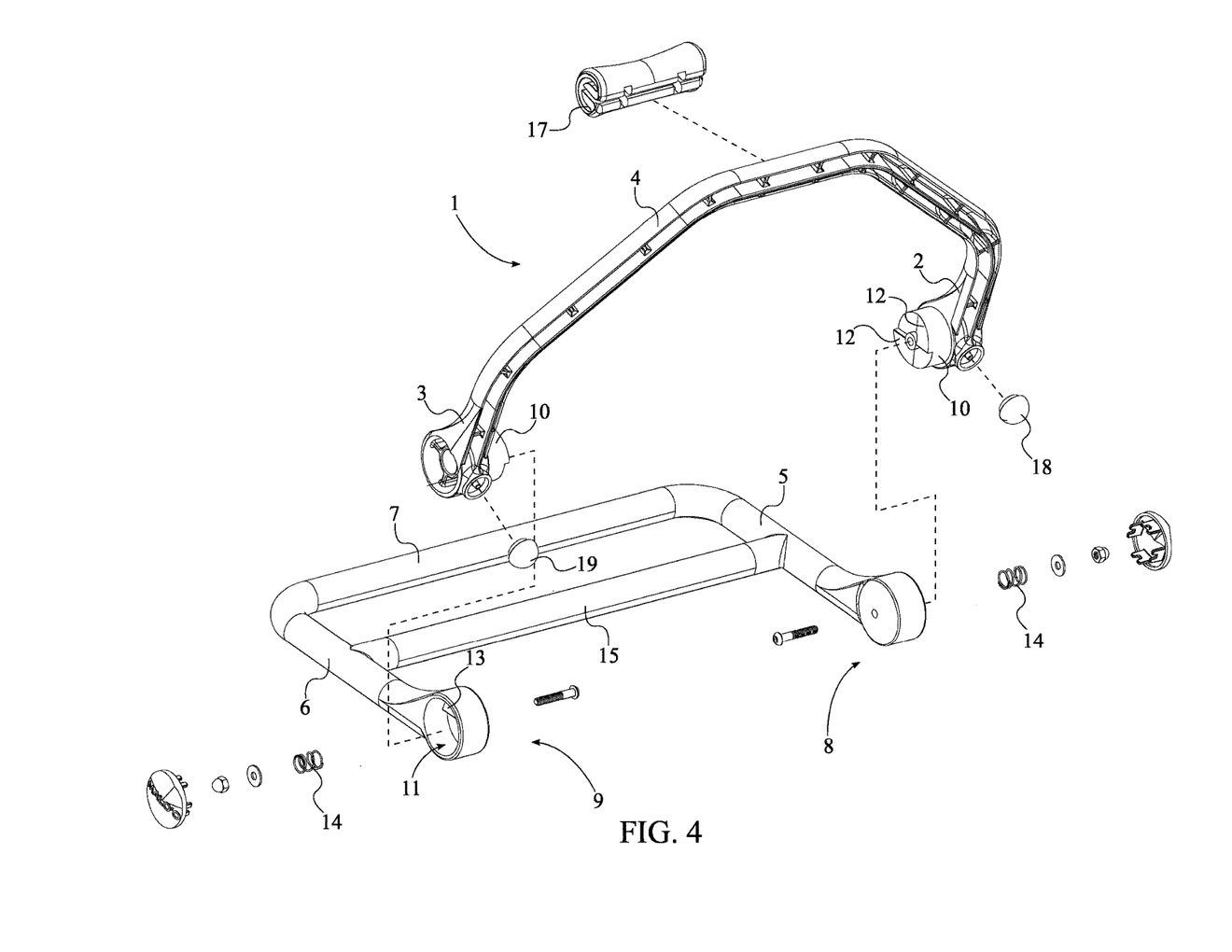
FIG. 4 is a rear perspective of the present invention in an exploded state.

The drying rod 7, the first support arm 5, and the second support arm 6 are coupled to the U-shaped bracket 1 through the first locking hinge 8 and the second locking hinge 9. The first locking hinge 8 and the second locking hinge 9 are each a mechanical joint device which couples two structural members together and allows said members to turn or pivot relative to each other. Additionally, the first locking hinge 8 and the second locking hinge 9 limit the range of motion for the coupled members. Referring to FIG. 4, the first support arm 5 is terminally mounted to the first leg 2 through the first locking hinge 8. Similarly, the second support arm 6 is terminally mounted to the second leg 3 through the second locking hinge 9. A variety of mechanisms may be used as the first locking hinge 8 and the second locking hinge 9. For efficient design, the drying rod 7 and the U-shaped bracket 1 are positioned opposite to each other, across the first support arm 5 and the second support arm 6.

Figure 5:
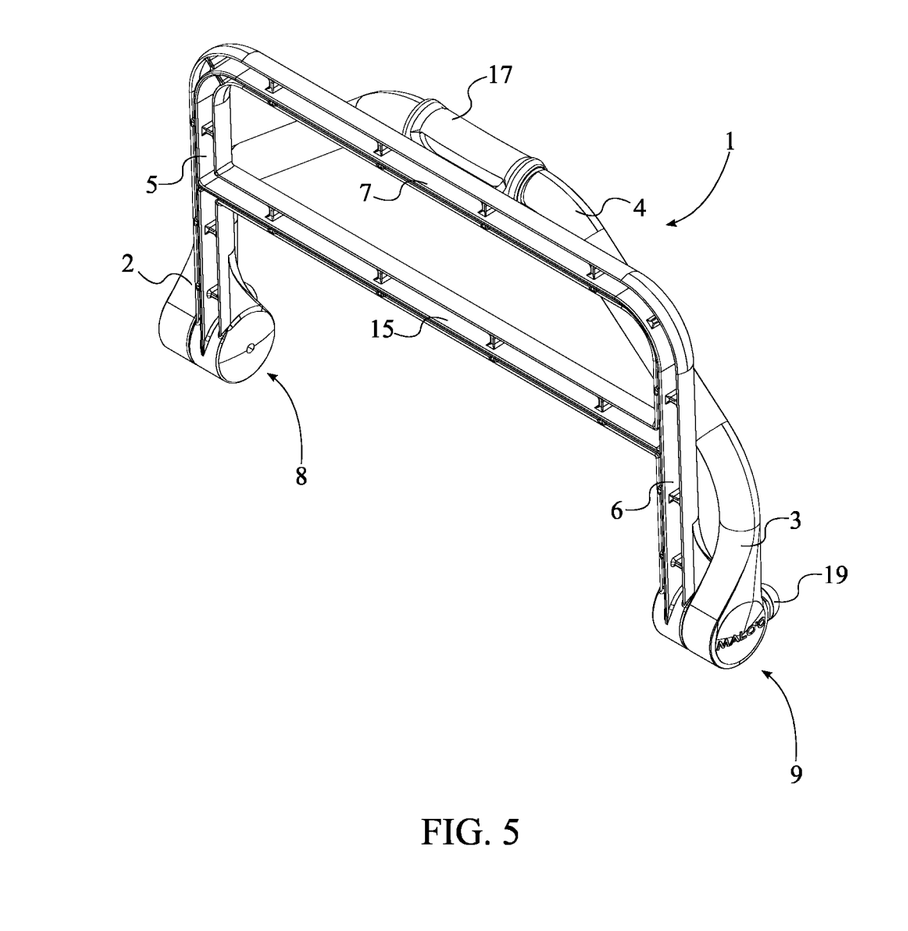
FIG. 5 is a perspective view of the present invention in the retracted configuration.
Figure 6:
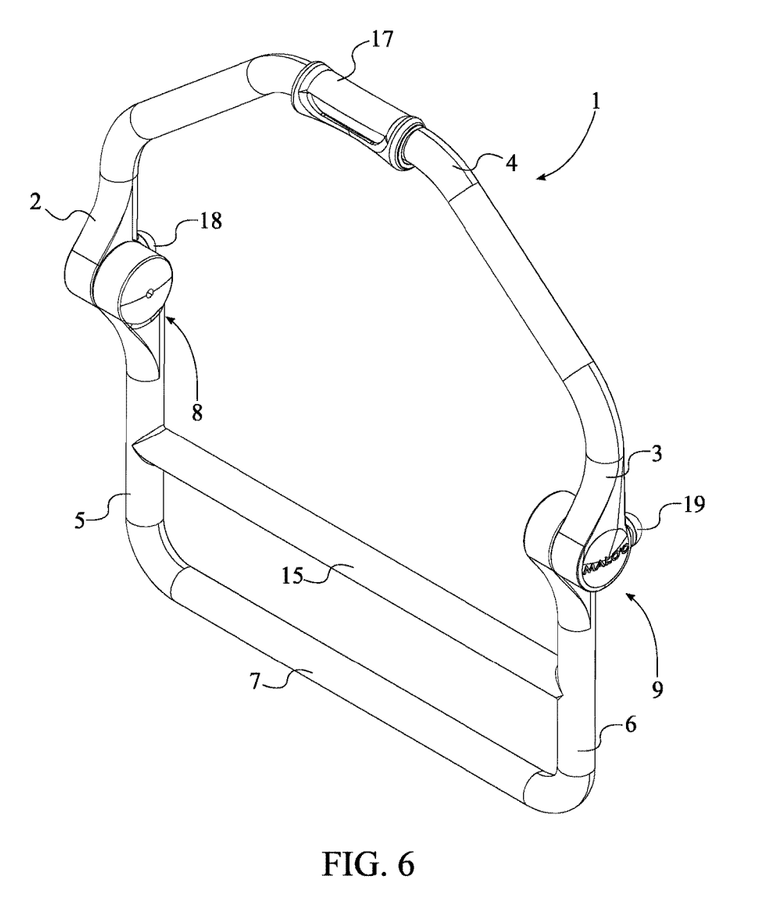
FIG. 6 is a perspective view of the present invention in the expanded configuration.

The present invention may be positioned into two configurations, a retracted configuration and an expanded configuration. When the U-shaped bracket 1, the first support arm 5, the second support arm 6, and the drying rod 7 are configuration into the retracted configuration, the overall profile of the present invention is reduced, ideal for storage and transportation. This allows the user to store and transport the present invention in the backseat or trunk of his or her vehicle. In the retracted configuration, the first support arm 5 is positioned parallel and adjacent to the first leg 2. Similarly, the second support arm 6 is positioned parallel and adjacent to the second leg 3. Resultantly, the drying rod 7 is positioned adjacent to the interconnecting rod 4 as seen in FIG. 5.

Figure 2:
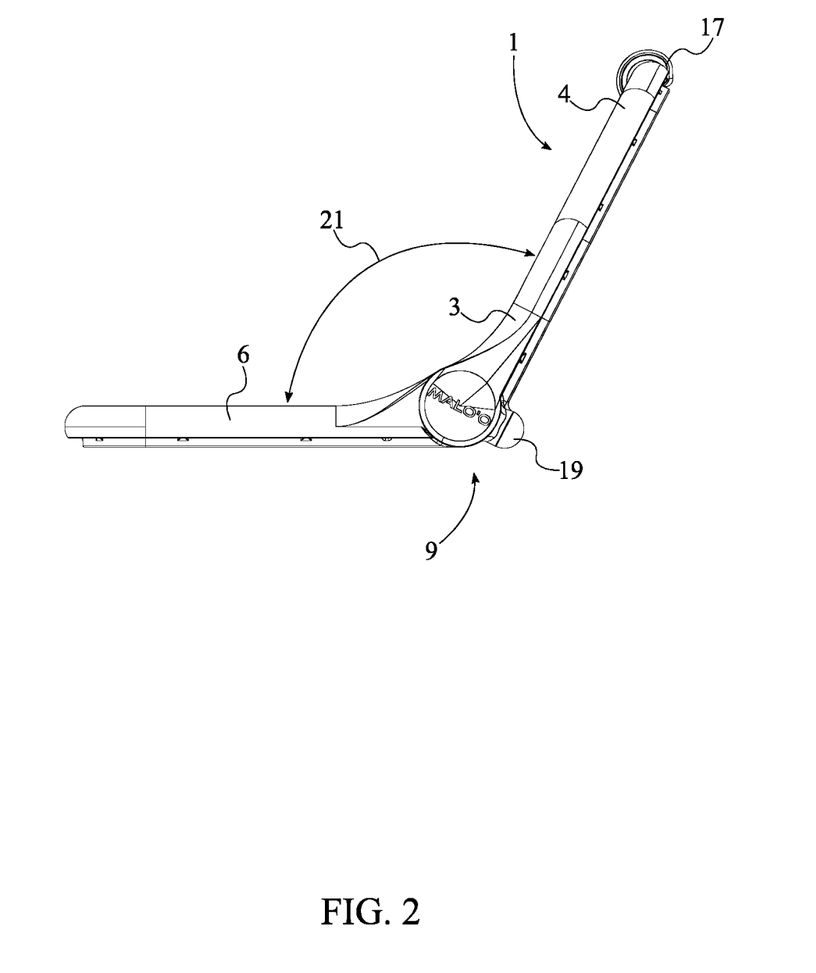
FIG. 2 is a right-side view of the present invention.
Figure 3:
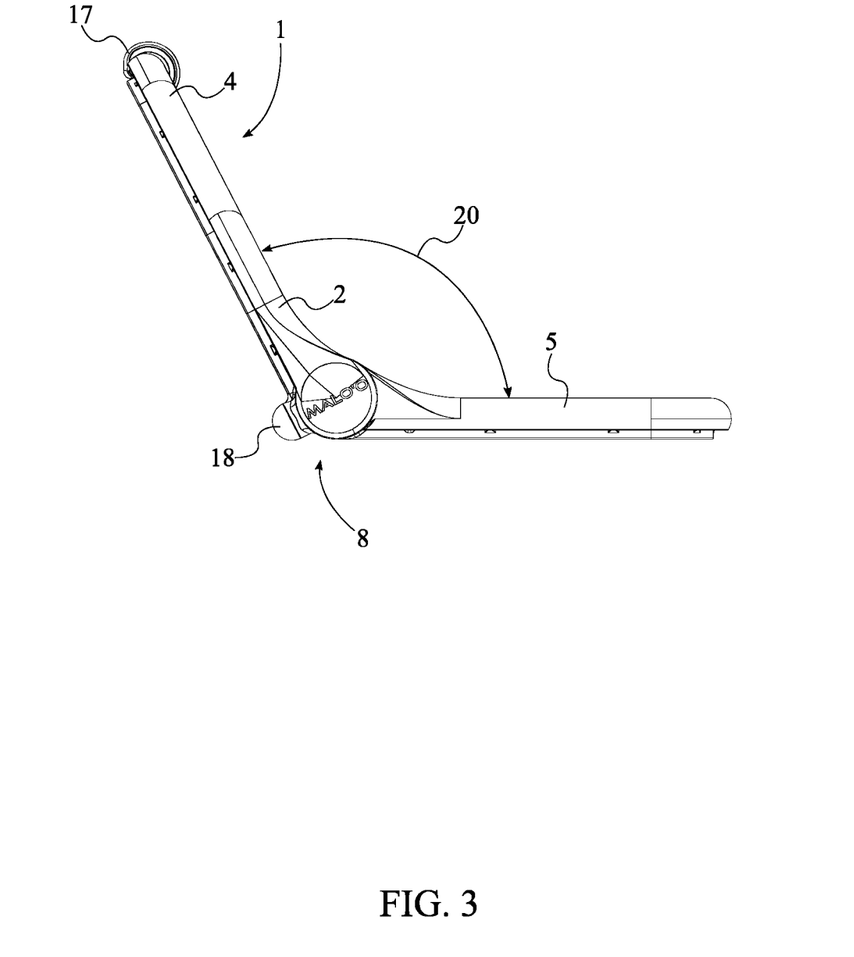
FIG. 3 is a left-side view of the present invention.

Referring to FIGS. 1-3 and FIG. 6, when the U-shaped bracket 1, the first support arm 5, the second support arm 6, and the drying rod 7 are configuration into the expanded configuration, the present invention is set to be mounted to a vehicle and support items in need of drying. More specifically, the first support arm 5 is positioned at a first angle 20 with the first leg 2 as seen in FIG. 3. Similarly, the second support arm 6 is positioned at a second angle 21 with the second leg 3 as seen in FIG. 2, wherein the first angle 20 is equal to the second angle 21. The first angle 20 and the second angle 21 are held constant by the first locking hinge 8 and the second hinge. Additionally, the present invention may be implemented in a variety of designs with varying degree for the first angle 20 and the second angle 21. To mount the present invention to a vehicle, the user utilizes the U-shaped bracket 1 as a hook to attach the present invention to a structural element of the vehicle, such as a mirror of the vehicle.

In one embodiment, the present invention further comprises an at least one additional drying rod 15, a mounting strap 16, a padded handle 17, a first rubber stopper 18, a second rubber stopper 19. The at least one additional drying rod 15 increasing the drying capacity of the present invention. Referring to FIG. 4, the additional drying rod 15 is identical to the drying rod 7 in design, shape, and size except the additional drying rod 15 is positioned closer to the U-shaped bracket 1. More specifically, the additional drying rod 15 is positioned in between the drying rod 7 and the U-shaped bracket 1. The additional drying rod 15 is also perpendicularly connected in between the first support arm 5 and the second support arm 6. Resultantly, the additional drying rod 15 doubles the holding capacity of the present invention. In alternative embodiments of the present invention, more than one additional drying rod 15 may be utilized to further increase the holding capacity of the present invention.

Referring to FIG. 1, the mounting strap 16 provides an additional mounting method for the present invention. The mounting strap 16 is tethered to the U-shaped bracket 1 at one end and can be tied to any external structure at the other end. For example, the mounting strap 16 allows the present invention to attach to a tree, a mounting rack of a vehicle, a door, and other structures preferred by the user. The mounting strap 16 is a flexible, strong, and generally rectangular piece of leather, cloth, or other flexible material. The mounting strap 16 is positioned in between the first leg 2 and the second leg 3. Additionally, the mounting strap 16 is centrally tethered to the interconnecting rod 4, thus ensuring symmetrical weight distribution for the U-shaped bracket 1. It is preferred that the mounting strap 16 is length adjustable to allow the user to vary the height at which the present invention is mounted.

The padded handle 17 acts as the gripping element of the present invention for the user. Additionally, the padded handle 17 acts as a cushioned buffer between the interconnecting rod 4 and the external surfaces of the vehicle that the present invention is mounted to. The padded handle 17 is an elongated tube sized complimentary to the interconnecting rod 4 and is preferably composed of a rubber or other similarly malleable/deformable material. Referring to FIG. 4, the padded handle 17 is positioned in between the first leg 2 and the second leg 3. Additionally, the padded handle 17 is centrally positioned about the interconnecting rod 4 as the middle point in between the first leg 2 and the second leg 3 would be used as the mounting point for the U-shaped bracket 1 for maximum stability. In order to ensure that the padded handle 17 does not slide relative to the interconnecting rod 4, the padded handle 17 is laterally connected to the interconnecting rod 4.

The first rubber stopper 18 and the second rubber stopper 19 provide an additional cushioned buffer between the U-shaped bracket 1 and the external surfaces of the vehicle that the present invention is mounted to. The first rubber stopper 18 and the second rubber stopper 19 are each a dome-shaped structures composed of rubber, or other material with similar characteristics. The first rubber stopper 18 covers the first leg 2 and, thus, is laterally connected to the first leg 2. Similarly, the second rubber stopper 19 covers the second leg 3 and, thus, is laterally connected to the second leg 3. When the present invention is mounted to a vehicle, the padded handle 17, the first rubber stopper 18, and the second rubber stopper 19 act as the contact points, thus preventing the present invention from damaging the exterior of the vehicle.

In the preferred embodiment, referring to FIG. 4, the first locking hinge 8 and the second locking hinge 9 each comprises a cylindrical body 10, a body-receiving cavity 11, a plurality of first semi-annular ramps 12, a plurality of second semi-annular ramps 13, and an elastic coupler 14. The cylindrical body 10 and the body-receiving cavity 11 act as a female-male coupling which enable the attached members to rotate relative to each other. The plurality of first semi-annular ramps 12, the plurality of second semi-annular ramps 13, and the elastic coupler 14 act as the locking mechanism in order to secure the present invention in the expanded configuration. The cylindrical body 10 of the first locking hinge 8 is positioned in between the first leg 2 and the second leg 3. More specifically, the cylindrical body 10 of the first locking hinge 8 is connected adjacent and perpendicular to the first leg 2. The body-receiving cavity 11 of the first locking hinge 8 laterally traverses into the first support arm 5, opposite the second support arm 6. To create the hinge, the cylindrical body 10 is slidably and rotatably mounted within the body-receiving cavity 11. More specifically, the cylindrical body 10 of the first locking hinge 8 is able to rotate within the body-receiving cavity 11 as well as slide in and out of the body-receiving cavity 11.

Each of the plurality of first semi-annular ramps 12 and each of the plurality of second semi-annular ramps 13 is a partial disk extrusion that is radially tapered as seen in FIG. 4. The plurality of first semi-annular ramps 12 of the first locking hinge 8 is radially distributed about the cylindrical body 10 of the first locking hinge 8; wherein each of the plurality of first semi-annular ramps 12 of the first locking hinge 8 is terminally connected to the cylindrical body 10 of the first locking hinge 8, opposite the first leg 2. The plurality of second semi-annular ramps 13 of the first locking hinge 8 is radially distributed about the body-receiving cavity 11 of the first locking hinge 8. Additionally, each of the plurality of second semi-annular ramps 13 is adjacently connected to the first leg 2. In reference to the first locking hinge 8, once the cylindrical body 10 is positioned within the body-receiving cavity 11, the plurality of first semi-annular ramps 12 is pressed against the plurality of second semi-annular ramps 13 by the elastic coupler 14. The elastic coupler 14 is a spring that is mechanically integrated in between first leg 2 and the first arm such that the first leg 2 is biased, pushed, towards the first leg 2. This biased state forces the plurality of first semi-annular ramps 12 to engage the plurality of second semi-annular ramps 13, thus preventing the first leg 2 and the first arm from opening up past the first angle 20.

The cylindrical body 10 of the second locking hinge 9 is positioned in between the first leg 2 and the second leg 3. More specifically, the cylindrical body 10 of the second locking hinge 9 is connected adjacent and perpendicular to the second leg 3. The body-receiving cavity 11 of the second locking hinge 9 laterally traverses into the second support arm 6, opposite the first support arm 5. To create the hinge, the cylindrical body 10 of the second locking hinge 9 is slidably and rotatably mounted within the body-receiving cavity 11 of the second locking hinge 9. More specifically, the cylindrical body 10 of the second locking hinge 9 is able to rotate within the body-receiving cavity 11 of the second locking hinge 9 as well as slide in and out of the body-receiving cavity 11 of the second locking hinge 9.

Each of the plurality of first semi-annular ramps 12 and each of the plurality of second semi-annular ramps 13 is a partial disk extrusion that is radially tapered as seen in FIG. 4. The plurality of first semi-annular ramps 12 of the second locking hinge 9 is radially distributed about the cylindrical body 10 of the second locking hinge 9; wherein each of the plurality of first semi-annular ramps 12 of the first locking hinge 8 is terminally connected to the cylindrical body 10 of the second locking hinge 9, opposite the second leg 3. The plurality of second semi-annular ramps 13 of the second locking hinge 9 is radially distributed about the body-receiving cavity 11 of the second locking hinge 9. Additionally, each of the plurality of second semi-annular ramps 13 is adjacently connected to the first leg 2. In reference to the second locking hinge 9, once the cylindrical body 10 is positioned within the body-receiving cavity 11, the plurality of first semi-annular ramps 12 is pressed against the plurality of second semi-annular ramps 13 by the elastic coupler 14. The elastic coupler 14 is a spring that is mechanically integrated in between second leg 3 and the second arm such that the second leg 3 is biased, pushed, towards the second leg 3. This biased state forces the plurality of first semi-annular ramps 12 to engage the plurality of second semi-annular ramps 13, thus preventing the second leg 3 and the second arm from opening up past the second angle 21.

Although the invention has been explained in relation to its preferred embodiment, it is to be understood that many other possible modifications and variations can be made without departing from the spirit and scope of the invention as hereinafter claimed.

What is claimed is:

1. A portable and versatile drying rack comprising:
   a U-shaped bracket;
   a first support arm;
   a second support arm;
   a drying rod;
   a first locking hinge;
   a second locking hinge;
   the U-shaped bracket comprising a first leg, a second leg, and an interconnecting rod;
   the first support arm and the second support arm being positioned parallel and offset to each other;
   the first support arm being terminally mounted to the first leg through the first locking hinge;
   the second support arm being terminally to the second leg through the second locking hinge;
   the drying rod and the U-shaped bracket being positioned opposite to the each other, across the first support arm and the second support arm;
   the drying rod being perpendicularly connected in between the first support arm and the second support arm;
   the first locking hinge comprising a cylindrical body, a body-receiving cavity, a plurality of first semi-annular ramps, a plurality of second semi-annular ramps and an elastic coupler, the cylindrical body being positioned in between the first leg and the second leg, the cylindrical body being connected adjacent and perpendicular to the first leg, the body-receiving cavity laterally traversing into the first support arm opposite the second support arm, the plurality of first semi-annular ramps being radially distributed about the cylindrical body, each of the plurality of first semi-annular ramps being terminally connected to the cylindrical body opposite the first leg, the plurality of second semi-annular ramps being radially distributed about the body-receiving cavity, each of the plurality of second semi-annular ramps being connected to the first leg, the cylindrical body being slidably and rotatably mounted within the body-receiving cavity, the plurality of first semi-annular ramps being pressed against the plurality of second semi-annular ramps by the elastic coupler; and
   the second locking hinge comprising a cylindrical body, a body-receiving cavity, a plurality of first semi-annular ramps, a plurality of second semi-annular ramps and an elastic coupler, the cylindrical body being positioned in between the first leg and the second leg, the cylindrical body being connected adjacent and perpendicular to the second leg, the body-receiving cavity laterally traversing into the second support arm opposite the first support arm, the plurality of first semi-annular ramps being radially distributed about the cylindrical body, each of the plurality of first semi-annular ramps being terminally connected to the cylindrical body opposite the second leg, the plurality of second semi-annular ramps being radially distributed about the body-receiving cavity, each of the plurality of second semi-annular ramps being connected to the second leg, the cylindrical body being slidably and rotatably mounted within the body-receiving cavity, and the plurality of first semi-annular ramps being pressed against the plurality of second semi-annular ramps by the elastic coupler.

2. The portable and versatile drying rack as claimed in claim 1 comprising:
   an at least one additional drying rod;
   the additional drying rod being positioned in between the drying rod and the U-shaped bracket; and
   the additional drying rod being perpendicularly connected in between the first support arm and the second support arm.

3. The portable and versatile drying rack as claimed in claim 1 comprising:
   a mounting strap;
   the mounting strap being positioned in between the first leg and the second leg; and
   the mounting strap being centrally tethered to the interconnecting rod.

4. The portable and versatile drying rack as claimed in claim 1 comprising:
   a padded handle;
   the padded handle being positioned in between the first leg and the second leg;
   the padded handle being centrally positioned about the interconnecting rod; and
   the padded handle being laterally connected to the interconnecting rod.

5. The portable and versatile drying rack as claimed in claim 1 comprising:
   a first rubber stopper;
   a second rubber stopper;
   the first rubber stopper being laterally connected to the first leg; and
   the second rubber stopper being laterally connected to the second leg.

6. The portable and versatile drying rack as claimed in claim 1 comprising:
   wherein the U-shaped bracket, the first support arm, the second support arm, and the drying rod are configured into a retracted configuration;
   the first support arm being positioned parallel and adjacent to the first leg;
   the second support arm being positioned parallel and adjacent to the second leg; and
   the drying rod being positioned adjacent to the interconnecting rod.

7. The portable and versatile drying rack as claimed in claim 1 comprising:
   wherein the U-shaped bracket, the first support arm, the second support arm, and the drying rod are configured into an expanded configuration;
   the first support arm being positioned at a first angle with the first leg;
   the second support arm being positioned at a second angle with the second leg; and
   the first angle being equal to the second angle.

8. A portable and versatile drying rack comprising:
   a U-shaped bracket;
   a first support arm;
   a second support arm;
   a drying rod;
   a first locking hinge;
   a second locking hinge;
   an at least one additional drying rod;
   the U-shaped bracket comprising a first leg, a second leg, and an interconnecting rod;
   the first support arm and the second support arm being positioned parallel and offset to each other;
   the first support arm being terminally mounted to the first leg through the first locking hinge;
   the second support arm being terminally to the second leg through the second locking hinge;
   the drying rod and the U-shaped bracket being positioned opposite to the each other, across the first support arm and the second support arm;
   the drying rod being perpendicularly connected in between the first support arm and the second support arm;
   the additional drying rod being positioned in between the drying rod and the U-shaped bracket;
   the additional drying rod being perpendicularly connected in between the first support arm and the second support arm;
   the first locking hinge comprising a cylindrical body, a body-receiving cavity, a plurality of first semi-annular ramps, a plurality of second semi-annular ramps and an elastic coupler, the cylindrical body being positioned in between the first leg and the second leg, the cylindrical body being connected adjacent and perpendicular to the first leg, the body-receiving cavity laterally traversing into the first support arm opposite the second support arm, the plurality of first semi-annular ramps being radially distributed about the cylindrical body, each of the plurality of first semi-annular ramps being terminally connected to the cylindrical body opposite the first leg, the plurality of second semi-annular ramps being radially distributed about the body-receiving cavity, each of the plurality of second semi-annular ramps being connected to the first leg, the cylindrical body being slidably and rotatably mounted within the body-receiving cavity, the plurality of first semi-annular ramps being pressed against the plurality of second semi-annular ramps by the elastic coupler; and
   the second locking hinge comprising a cylindrical body, a body-receiving cavity, a plurality of first semi-annular ramps, a plurality of second semi-annular ramps and an elastic coupler, the cylindrical body being positioned in between the first leg and the second leg, the cylindrical body being connected adjacent and perpendicular to the second leg, the body-receiving cavity laterally traversing into the second support arm opposite the first support arm, the plurality of first semi-annular ramps being radially distributed about the cylindrical body, each of the plurality of first semi-annular ramps being terminally connected to the cylindrical body opposite the second leg, the plurality of second semi-annular ramps being radially distributed about the body-receiving cavity, each of the plurality of second semi-annular ramps being connected to the second leg, the cylindrical body being slidably and rotatably mounted within the body-receiving cavity, and the plurality of first semi-annular ramps being pressed against the plurality of second semi-annular ramps by the elastic coupler.

9. The portable and versatile drying rack as claimed in claim 8 comprising:
   a mounting strap;
   the mounting strap being positioned in between the first leg and the second leg; and
   the mounting strap being centrally tethered to the interconnecting rod.

10. The portable and versatile drying rack as claimed in claim 8 comprising:
   a padded handle;
   the padded handle being positioned in between the first leg and the second leg;
   the padded handle being centrally positioned about the interconnecting rod; and
   the padded handle being laterally connected to the interconnecting rod.

11. The portable and versatile drying rack as claimed in claim 8 comprising:
   a first rubber stopper;
   a second rubber stopper;
   the first rubber stopper being laterally connected to the first leg; and
   the second rubber stopper being laterally connected to the second leg.

12. The portable and versatile drying rack as claimed in claim 8 comprising:
   wherein the U-shaped bracket, the first support arm, the second support arm, and the drying rod are configured into a retracted configuration;

the first support arm being positioned parallel and adjacent to the first leg;

the second support arm being positioned parallel and adjacent to the second leg; and the drying rod being positioned adjacent to the interconnecting rod.

13. The portable and versatile drying rack as claimed in claim 8 comprising:

wherein the U-shaped bracket, the first support arm, the second support arm, and the drying rod are configured into an expanded configuration;

the first support arm being positioned at a first angle with the first leg;

the second support arm being positioned at a second angle with the second leg; and the first angle being equal to the second angle.

\* \* \* \* \*